United States Patent [19]

Kaschke

[11] Patent Number: 5,555,550
[45] Date of Patent: Sep. 10, 1996

[54] KEYPAD APPARATUS WITH INTEGRAL DISPLAY INDICATORS

[75] Inventor: Kevin D. Kaschke, Schaumburg, Ill.

[73] Assignee: Motorola, Inc., Schaumburg, Ill.

[21] Appl. No.: 297,436

[22] Filed: Aug. 29, 1994

Related U.S. Application Data

[63] Continuation of Ser. No. 983,112, Nov. 30, 1992, abandoned, which is a continuation of Ser. No. 591,185, Oct. 1, 1990, abandoned.

[51] Int. Cl.⁶ ................................................ H04Q 7/32
[52] U.S. Cl. ................ 379/59; 379/368; 341/22; 364/189; 345/168
[58] Field of Search .................. 341/22, 28; 379/58, 379/59, 63, 164, 368, 369, 428, 429, 433, 451; 455/89, 90; 200/341, 5 E; 226/135; 234/124; 345/168, 170; 364/189, 709.12; 434/228

[56] References Cited

U.S. PATENT DOCUMENTS

| | | | |
|---|---|---|---|
| 4,056,696 | 11/1977 | Meyerle et al. | 379/58 |
| 4,142,312 | 3/1979 | Stokes | 379/58 |
| 4,349,705 | 9/1982 | Kohfus | 379/368 |
| 4,374,308 | 2/1983 | Holesha | 379/164 |
| 4,375,584 | 3/1983 | Mozomdar et al. | 379/429 |
| 4,636,593 | 1/1987 | Novak et al. | 200/5 A |
| 4,734,679 | 3/1988 | Haskins | 379/368 |
| 4,916,262 | 4/1990 | Jungels-Butler | 200/5 A |
| 4,990,896 | 2/1991 | Gray | 379/164 |
| 5,011,728 | 4/1991 | Imae et al. | 379/451 |

FOREIGN PATENT DOCUMENTS

| | | | |
|---|---|---|---|
| 0323916 | 12/1989 | European Pat. Off. | |
| 63-0185259 | 7/1988 | Japan | 379/396 |
| 0222547 | 9/1989 | Japan | 379/396 |
| 2160068 | 12/1985 | United Kingdom | 379/396 |

OTHER PUBLICATIONS

The Sharper Image Catalog, "Technology's New Wave", pp. 6,7, May 1985.
Advertisement: Electronics magazine, "It's The Way We Put Them Together That Sets Us Apart", Jun. 1990 (Motorola Micro T.A.C).
U.S. News & World Report article: "Best of America The Products", pp. 73, 74, Jul. 1990, (Motorola Micro T.A.C).

*Primary Examiner*—Dwayne D. Bost
*Attorney, Agent, or Firm*—Kevin D. Kaschke

[57] ABSTRACT

A keypad apparatus (100) with integral display indicator bars (102–104) provides input to a device while displaying the status of the device on the display indicator bars (102–104). The apparatus is comprised of a matrix of data input keys (101). The indicator bars (102–104) are coupled to the matrix of keys (101), the apparatus (100) being manufactured as a single unit. Both the data input keys (101) and the indicator bars (102–104) are comprised of substantially the same material; a flexible and translucent silicone material. This material enables the keypad apparatus, that is backlit by the device, to diffuse the light, thereby lighting the data keys. Each indicator bar (102–104) has an individual backlight (108) from the device, allowing a particular indicator bar to be lit individually.

27 Claims, 3 Drawing Sheets

KEYPAD APPARATUS WITH INTEGRAL DISPLAY INDICATORS

This is a continuation of application Ser. No. 07/983,112, filed Nov. 30, 1992 and now abandoned, which is a continuation of application Ser. No. 07/591,185, filed Oct. 1, 1990 and now abandoned.

FIELD OF THE INVENTION

The present invention relates generally to the field of indicators.

BACKGROUND OF THE INVENTION

Light emitting diode (LED) light bars are typically used to indicate the status of a communications device, such as a radiotelephone. This status can include power indication, whether the communications device is electronically locked, and whether the device is in use.

These LED light bars are relatively expensive and require manual placement and soldering during the manufacturing process. Additionally, each label for the indicator lights must be silk screened on the communication device's lens since the light bar cannot be screened. This can add expense when a manufacturer has various models of approximately the same design and only the indicator labels vary. The manufacturer must make a different display lens for each model. There is a resulting need for an indicator that is less expensive to purchase and requires less labor to incorporate into a device.

SUMMARY OF THE INVENTION

A keypad apparatus with integral display indicator bars of the present invention provides input to a device while displaying the status of the device on the display indicator bars. The apparatus is comprised of a matrix of data input keys. Each key in a row is coupled to the key next to it in the row and each key in a column is coupled to the key next to it in the column. The indicator bars are coupled to the matrix of keys, the present invention being manufactured as a single unit. Both the data input keys and the indicator bars are comprised of substantially the same material; a flexible and translucent silicone material. This material enables the keypad apparatus, that is backlit by the device, to diffuse the light, thereby lighting the data keys. Each indicator bar has an individual backlight from the device, allowing each indicator bar to be lit individually, depending on the status indication desired.

DETAILED DESCRIPTION OF THE PREFERRED EMBODIMENT

The keypad apparatus with integral display indicator bars of the present invention provides input to and status of a device, such as a radiotelephone. The device provides the general backlighting to light up the keypad and the specific lighting for illuminating the indicator bars, thus enabling operation of the apparatus in low or no light conditions.

Figure 1:
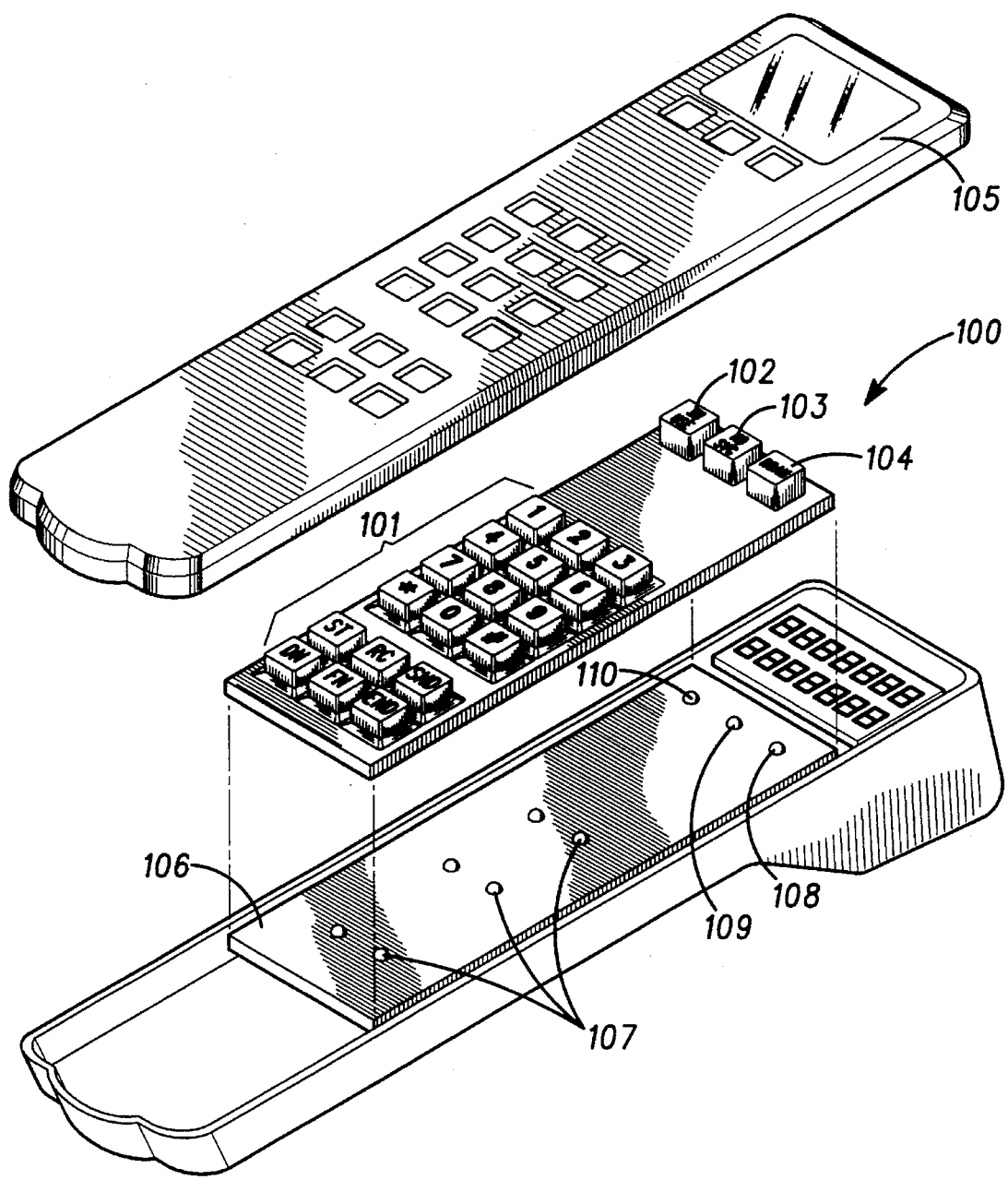
FIG. 1 shows the preferred embodiment of the keypad popple with integral display of the present invention used in a typical application in a cellular radiotelephone.
Figure 3:
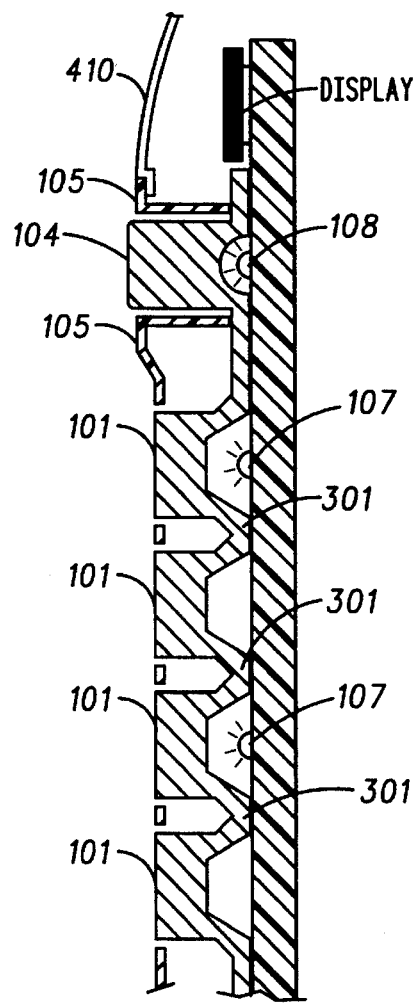
FIG. 3 shows a side view of the present invention in a typical application in a cellular radiotelephone.

The apparatus, illustrated in FIG. 1, is comprised of a matrix of data input keys with at least one separate area of display indicator bars, the entire apparatus being manufactured as a single unit. Each key is coupled to the adjacent key by a leg (301), as illustrated in FIG. 3. This apparatus is typically referred to as a popple. In the preferred embodiment, the apparatus is comprised of a flexible, translucent, silicone material that internally diffuses backlighting provided by the device.

Figure 2A:
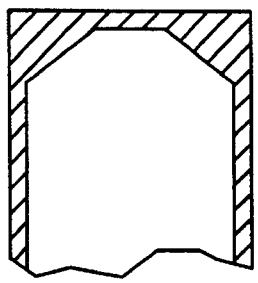
FIG. 2A–2C shows different embodiments of varying the thickness of the key and indicator bar material.
Figure 2B:
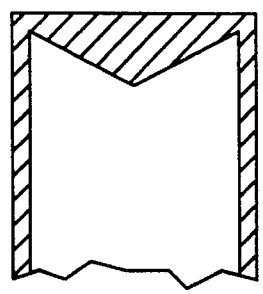
Figure 2C:
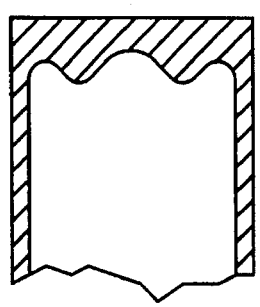

The thickness and density of the material determines the amount of light diffusion. Thicker material will diffuse and scatter more light than thinner material reducing the light that reaches the top of the indicator bar and therefore the indicator bars will not be lit as brightly. Different variations in thickness, illustrated FIGS. 2A–2C, result in different lighting patterns on the top surface of the indicator bar. This can be used to vary the intensity or evenness of the top surface of the indicator bar, depending on function or aesthetic appearance desired. An "IN USE" indicator bar, for example, can be made brighter than the rest of the indicators or data keys in order to make that indicator stand out from the rest. Additionally, making the indicator bar's top surface thinner in the middle, as illustrated in FIG. 2A, can be used to cause a hot spot on that indicator. LEDs and other light sources can have a narrow, broad or uneven illumination pattern. Varying the thickness of the tops of the indicators, as illustrated in FIGS. 2B and 2C, evens out the lighting by diffusing more light in some areas and less in others. The indicator illustrated in FIG. 2B, for example, is used for a light source having an illumination pattern that is stronger in the center than the sides. A similar scheme can be used for the data input keys.

The hardness of the indicator bars (102–104) can be increased to produce a different look and feel from the data input keys (101). This will make the indicator bars (102–104) less flexible and appear more solid than the data input keys (101). The appearance and diffusion characteristics of the indicator bars (102–104) can also be changed by adding more opaque silicone based material to the silicone. This has the effect of making the silicone less translucent and therefore reduces the amount of light reaching the top surface.

A typical application of the present invention in a radiotelephone is illustrated in FIG. 1. This figure shows the data input keys (101) of the present invention used as a telephone number input keypad with the associated radiotelephone control keys. The display indicator bars (102–104) are used to display the radiotelephone status. This status includes "NO SVC", "ROAM", and "IN USE".

Since the indicator bars are translucent, light meant for one indicator bar (104) can exit that indicator (104) and enter an adjacent one (103). This can cause problems if different colored light sources are used in each indicator bar (102–104) or if one indicator bar LED (108) is lit and the adjacent one (109) is not. In order to eliminate this leaking, the housing top (105) extends down around the four sides of the indicators (102–104), the indicator bars (102–104) are made flush with the printed circuit board (106), and the light source (108) has a narrow viewing angle. This is illustrated in FIG. 3.

The LEDs for backlighting (107 and 108–110) the present invention in the radiotelephone are located as illustrated in FIG. 2. The data input key LEDs (107) are located so that one LED lights approximately four keys. The indicator bars (102–104) have individual LEDs (108–110), each having a different color, allowing a particular indicator (102–104) to be lit when that status is active.

Figure 4:
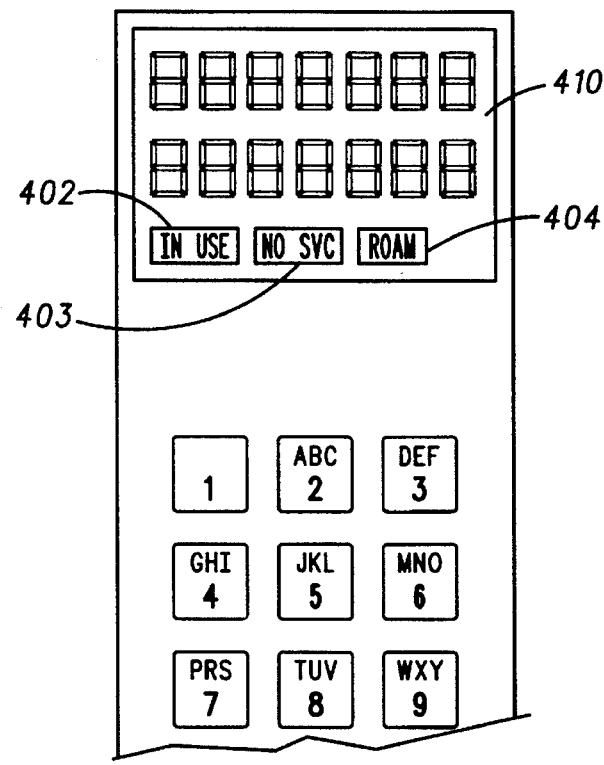
FIG. 4 shows an alternate embodiment of the present invention.

The labels or symbols for the data input keys (101) are silk screened on top of the key. The label or symbol screening for the indicator bars (102–104) depends on the embodiment of the present invention. If the preferred embodiment is used, the symbols are screened directly on the top of the indicator bars, in the same manner as the data input keys. This is illustrated in FIG. 1. In an alternate embodiment, illustrated in FIG. 4, the indicator bars (402–404) are under the display lens (410). In this case, the symbols representing the status are screened on the lens (410) over the indicator bar (402–404) representing that status.

Figure 5:
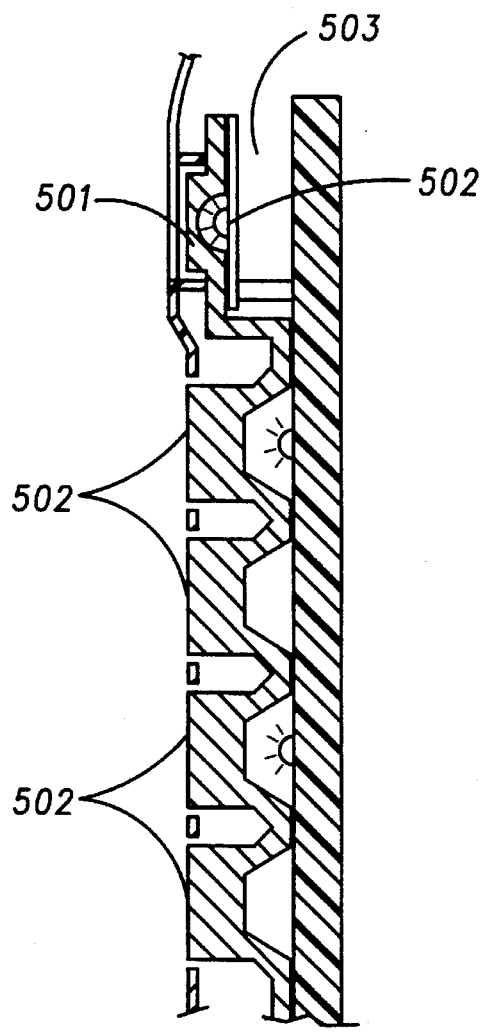
FIG. 5 shows another alternate embodiment of the present invention.

Another alternate embodiment of the present invention, illustrated in FIG. 5, mounts the indicator bars (501) in a different plane from the data input keys (502). This enables the indicator bars (501) to be mounted on a display module printed circuit board (503) where the specific LEDs (502) are located.

The present invention provides a number of benefits. The manufacturing of the present invention into a device is less expensive than prior art indicators. The LEDs, are surface mount components that are robotically placed on the printed circuit substrate. The present invention is placed in the housing top. The present invention, therefore, eliminates the hand placement and hand soldering of the prior art indicators.

The present invention is also less expensive than the prior art keypad and separate hardwired indicators. To combine the data input keys and indicators into one unit requires only a slightly larger mold, extra silicone material, and additional surface mount LEDs to light the indicators. The prior art apparatus requires separate, relatively expensive light bars.

Figure 6:
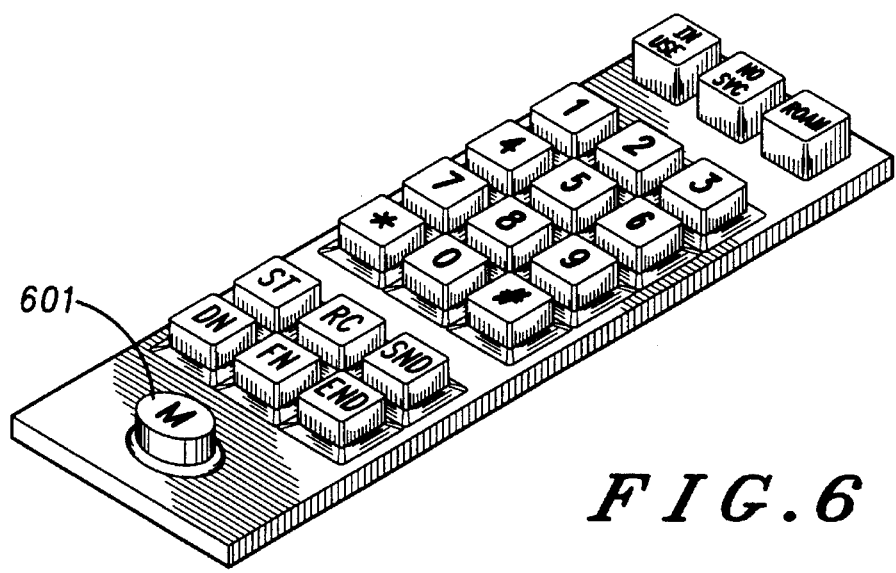
FIG. 6 shows yet another alternate embodiment of the present invention.

While the preferred embodiment of the present invention is used in a cellular radiotelephone, the present invention can be used in any device needing data input keys and indicator bars. These devices can include radios and landline telephones. The shape of the indicator bars is not limited to a rectangular shape; they can be formed in any shape required such as a circle or triangle. Additionally, the indicator bars can be used for other than status indication; an example of which being a company logo (601) as illustrated in FIG. 6. Instead of a company nameplate or silk screened company logo on the housing, a backlit company logo presents more appeal and makes the product easily identifiable at night.

In summary, a keypad apparatus having integral indicator bars has been shown. This apparatus can be used to enter data into a device with the data input keys while showing the status of the device with the indicator bars. If a manufacturer has multiple models that change only the key labels, the device housing for each model remains the same and only the labels on the present invention change. Thus, the present invention provides a material and labor cost advantage over conventional light bars.

I claim:

1. A keypad apparatus for a device having internal lighting means comprising general lighting means and specific lighting means; the keypad apparatus comprising:

a plurality of data keys for inputting data to the device, the plurality of data keys being coupled together by legs and arranged in a matrix pattern, the plurality of data keys being formed of a translucent material allowing light from the general lighting means to be diffused within each key; and at least one indicator bar integrally molded with the plurality of data keys to form a single-piece unitary member, the at least one indicator bar diffusing light from specific lighting means, each indicator bar adapted to provide a status of the device;

wherein the integrally molded indicator bars are immoveable relative to the yielding movement of the integrally molded plurality of data keys.

2. The apparatus of claim 1 wherein the material is a substantially translucent silicone.

3. The apparatus of claim 1 wherein the at least one indicator bar has at least one symbol disposed thereon to indicate the status of the device.

4. The apparatus of claim 1 wherein the at least one indicator bar is comprised of a variable thickness of the translucent material.

5. The apparatus of claim 1 wherein one of the plurality of data keys is comprised of a variable thickness of the translucent material.

6. A flexible keypad apparatus for a radiotelephone device having internal lighting means comprising general lighting means and specific lighting means, the flexible keypad apparatus comprising:

a plurality of data keys for inputting the data to the radiotelephone device, the plurality of data keys being coupled together by legs and arranged in a matrix pattern, each data key having at least one symbol disposed on a top surface thereof for representing the data key, the plurality of data keys being formed of a substantially flexible and translucent silicone material allowing light from the general lighting means to be diffused within each key and illuminate the top surface; and a plurality of indicator bars integrally molded with the plurality of data keys to form a single-piece unitary member, each indicator bar having at least one symbol disposed on a top surface thereof for indicating a particular status of the radiotelephone device, each indicator bar diffusing light from specific lighting means, each indicator bar adapted to provide a status of the device;

wherein the integrally molded indicator bars are immoveable relative to the yielding movement of the integrally molded plurality of data keys.

7. The apparatus of claim 6 wherein the plurality of indicator bars are comprised of a less flexible silicone material than the plurality of data keys.

8. The apparatus of claim 6 wherein one of the plurality of indicator bars is comprised of a variable thickness of the translucent material.

9. The apparatus of claim 6 wherein one of the plurality of data keys is comprised of a variable thickness of the translucent material.

10. A flexible keypad apparatus for a radiotelephone device having internal lighting means comprising general lighting means and specific lighting means, the flexible keypad apparatus comprising:

a plurality of data keys in a first plane for inputting the data to the radiotelephone device, the plurality of data keys being coupled together and arranged in a matrix pattern, each data key having at least one symbol disposed a top surface thereof for representing the data key, the plurality of data keys being formed of a substantially flexible and translucent silicone material allowing light from the general lighting means to be diffused within each key and illuminate the top surface; and a plurality of indicator bars integrally molded with the plurality of data keys to form a single-piece unitary member, and in a second plane that is parallel to the first plane, each indicator bar having at least one symbol disposed on a top surface thereof for indicating a particular status of the radiotelephone device, each indicator bar diffusing light from specific lighting means, each indicator bar adapted to provide a status of the device;

wherein the integrally molded indicator bars are immoveable relative to the yielding movement of the integrally molded plurality of data keys.

11. The apparatus of claim 10 wherein the plurality of indicator bars are comprised of a less flexible silicone material than the plurality of data keys.

12. The apparatus of claim 10 wherein one of the plurality of indicator bars is comprised of a variable thickness of the translucent material.

13. The apparatus of claim 10 wherein one of the plurality of data keys is comprised of a variable thickness of the translucent material.

14. A cellular radiotelephone device having internal lighting means comprised of general lighting means and specific lighting means, the cellular radiotelephone device comprising:

transmitting means for transmitting cellular telephone calls;

receiving means for receiving cellular telephone calls;

display means for displaying radiotelephone data; and a keypad apparatus, comprising:

a plurality of data keys for inputting the radiotelephone data to the device, the plurality of data keys coupled together and arranged in a matrix pattern, each data key having at least one symbol disposed on a top surface thereof for representing each data key, the plurality of data keys being formedof a translucent material allowing light from the general lighting means to be diffused within each key and illuminate the top surface; and at least one indicator bar integrally molded with the plurality of data keys to form a single-piece unitary member, each indicator bar diffusing light from specific lighting means, each indicator bar adapted to provide a status of the device;

wherein the integrally molded indicator bars are immoveable relative to the yielding movement of the integrally molded plurality of data keys.

15. A keypad apparatus for a device having internal lighting means, the keypad apparatus comprising:

at least one data key for inputting the data to the device; and at least one indicator bar integrally molded with the at least one data key to form a single-piece unitary member and internally lit by the internal lighting means, the at least one indicator bar adapted to provide a status of the device;

wherein the integrally molded indicator bars are immoveable relative to the yielding movement of the integrally molded plurality of data keys.

16. The apparatus of claim 15 wherein the at least one indicator bar is comprised of substantially translucent silicone material.

17. The apparatus of claim 15 wherein the at least one indicator has a symbol disposed thereon for indicating a status of the device.

18. The apparatus of claim 15 wherein one of the plurality of indicator bars is comprised of a variable thickness of the translucent material.

19. The apparatus of claim 15 wherein one of the plurality of data keys is comprised of a variable thickness of the translucent material.

20. A device comprising:

at least one data key for inputting the data to the device;

at least one indicator bar for indicating a status of the device, integrally molded with the at least one data key to form a single-piece unitary member;

a housing having first and second holes disposed therein, the at least one data key and the at least one indicator bar at least partially disposed within the first and second holes, respectively;

a substrate disposed opposite the at least one indicator bar; and specific lighting means disposed on the substrate for lighting the at least one indicator bar, the at least one indicator bar diffusing light emitted from the specific lighting means;

wherein the integrally molded indicator bars are immoveable relative to the yielding movement of the integrally molded plurality of data keys.

21. A device in accordance with claim 20 further comprising:

means for confining the light, emitted from the specific lighting means, to the at least one indicator bar.

22. A device in accordance with claim 21 wherein the means for confining further comprises:

opaque barrier means integrally formed with the side of the housing and surrounding the indicator bar.

23. A device in accordance with claim 20 wherein the device includes a plurality of data keys, the device further comprising:

general lighting means disposed on the substrate for lighting the plurality of data keys, the plurality of data keys diffusing light emitted from the general lighting means.

24. The apparatus of claim 20 wherein the at least one indicator bar is comprised of substantially translucent silicone material.

25. The apparatus of claim 20 further comprising:

at least one symbol disposed on the at least one indicator bar for indicating the status of the device.

26. The apparatus of claim 20 wherein the at least one indicator bar further comprises:

a variable thickness of the translucent material.

27. The apparatus of claim 20 wherein the at least one data key further comprises:

a variable thickness of the translucent material.

* * * * *